(12) United States Patent
Shen et al.

(10) Patent No.: US 11,411,820 B2
(45) Date of Patent: Aug. 9, 2022

(54) METHOD FOR OPERATING AN ELECTRICAL DEVICE AND ELECTRICAL DEVICE IMPLEMENTING THIS METHOD

(71) Applicant: Schneider Electric Industries SAS, Rueil-Malmaison (FR)

(72) Inventors: Jiyue Shen, Grenoble (FR); Roland Bohrer, La Sure en Chartreuse (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 181 days.

(21) Appl. No.: 16/357,372

(22) Filed: Mar. 19, 2019

(65) Prior Publication Data

US 2019/0296977 A1    Sep. 26, 2019

(30) Foreign Application Priority Data

Mar. 22, 2018 (FR) ...................... 1852481

(51) Int. Cl.
*H04L 12/66* (2006.01)
*H04L 41/08* (2022.01)
(Continued)

(52) U.S. Cl.
CPC ............ *H04L 41/0886* (2013.01); *G06F 8/61* (2013.01); *G06F 9/00* (2013.01); *H01H 9/168* (2013.01); *H01H 71/04* (2013.01); *H01H 71/74* (2013.01); *H04L 12/2803* (2013.01); *H04L 12/66* (2013.01); *H04L 67/12* (2013.01); *H04L 67/125* (2013.01); *H04L 67/16* (2013.01);
(Continued)

(58) Field of Classification Search
CPC . H04L 41/0886; H04L 121/66; H04L 67/125; H04L 67/16; H04L 67/34; G06F 8/61; G06F 9/00; G06F 8/65; H01H 9/168; H01H 71/04; H01H 71/74
USPC ......................................................... 709/222
See application file for complete search history.

(56) References Cited

U.S. PATENT DOCUMENTS

| 2009/0254601 | A1* | 10/2009 | Moeller | .............. G06F 9/542 709/201 |
| 2014/0282103 | A1* | 9/2014 | Crandall | .............. G06F 3/0488 715/753 |
| 2017/0262263 | A1* | 9/2017 | Zinn | .............. G05B 19/0426 |

OTHER PUBLICATIONS

French Preliminary Search Report dated Oct. 2, 2018 in French Application 18 52481, filed on Mar. 22, 2018 (with English Translation of Categories of cited documents and Written Opinion).

(Continued)

*Primary Examiner* — Sibte H Bukhari
(74) *Attorney, Agent, or Firm* — Oblon, McClelland, Maier & Neustadt, L.L.P.

(57) ABSTRACT

A method for operating an electrical device, including automatically configuring a communication unit following the installation of a new application, wherein: a) the control unit broadcasts a notification of the installation of a new application; b) the communication gateway acquires the list of the types of data to which it is not yet subscribed and then sends, to the control unit, a request to subscribe to these types of data; c) the control unit receives the subscription request and compares the types listed in the subscription request with the types of data generated by the newly installed application; d) the communication gateway updates the accepted or denied subscription status for each type of data for which the subscription request has been accepted or denied during step c).

10 Claims, 3 Drawing Sheets

(51) Int. Cl.
| | |
|---|---|
| H04L 67/00 | (2022.01) |
| H04L 12/28 | (2006.01) |
| H04L 67/51 | (2022.01) |
| G06F 8/61 | (2018.01) |
| G06F 9/00 | (2006.01) |
| H01H 71/74 | (2006.01) |
| H04L 67/125 | (2022.01) |
| H04L 67/12 | (2022.01) |
| H01H 71/04 | (2006.01) |
| H01H 9/16 | (2006.01) |
| G06F 8/65 | (2018.01) |
| H04L 12/40 | (2006.01) |
| H04L 67/56 | (2022.01) |

(52) U.S. Cl.
CPC ............... *H04L 67/34* (2013.01); *G06F 8/65* (2013.01); *H04L 12/40* (2013.01); *H04L 67/28* (2013.01)

(56) References Cited

OTHER PUBLICATIONS

Ozansoy, C., et al., "The Real-Time Publisher/Subscriber Communication Model for Distributed Substation Systems", IEEE Transactions on Power Delivery, vol. 22, No. 3, Jul. 2007, pp. 1-13.

\* cited by examiner

METHOD FOR OPERATING AN ELECTRICAL DEVICE AND ELECTRICAL DEVICE IMPLEMENTING THIS METHOD

The present invention relates to a method for operating an electrical device and an electrical device implementing this method.

The invention applies more generally to the field of electrical devices used in electrical installations, in particular devices for electrical protection, electrical measurement or electrical switching, and more particularly devices for cutting off an electric current such as isolators or contactors, these electrical devices being provided with an electronic control unit able to execute embedded software applications. These applications make it possible to implement advanced functionalities, such as remote control, supervision and management functions, which improve the operation of these devices.

It is desirable to be able to upgrade these functions over time and as a function of the needs of the users. For example, the users may choose to use only the functions which interest them as a function of the usage for which the device is intended. They may also wish to add or remove certain functions, if their needs evolve over time. This also allows the manufacturer to upgrade the devices throughout their lifetime, or indeed to offer users specific bespoke functions designed as a function of particular needs. Indeed, it is not always possible to know, when designing a product, what usage will be made thereof by users throughout the life cycle of this product.

Upgradable behaviour such as this must be easily and rapidly implementable by users. To this end, the applications are distributed in the form of executable software modules which can be "plugged in", that is to say installed and uninstalled "hot" in the control unit, by the client, while the device is operating.

Typically, once installed, these applications are executed by the control unit. During their execution, they generate a stream of data intended to be transmitted to a remote receiver. The data may pertain to state data relating to the operation of the device, and/or relating to measurements of electrical quantities and/or to calculated or composite indicators relating to the device and/or to the electrical installation with which the device is associated. The data are for example generated and intended to be sent continuously or periodically over time. By virtue of this sending of data, the device can be controlled, driven and supervised remotely. The sending of the data to the remote receiver is ensured by an embedded communication interface on board the device, which is connected to the control unit by an internal data link.

A drawback of these known devices is that, in certain cases, the recipient of the data may not wish to receive certain types of data generated by the installed applications. Indeed, the applications are often generic modules produced by a publisher and obtained from on-line application stores. Stated otherwise, the applications are not always designed as bespoke for the user, and it often happens that a user needs only certain data generated by an application, without needing the other data generated by this application. The user cannot always choose precisely which data are generated by the application.

It is appropriate to avoid sending data which the user does not need, since this unnecessarily saturates the data exchange links, which may be prejudicial to the proper operation of the device, and even compromise the user's ability to drive and supervise the device remotely.

It is not desirable to parametrize the communication interface with fixed parameters too rigorously in advance, since this would be detrimental to the upgradable character of the device. Neither is it desirable to require the user to manually parametrize the communication interface each time a module is installed, since this would considerably complicate the use of the device.

A need therefore exists for an electrical device, and an associated operating method, in which the communication interface is configured automatically when installing an executable module in the control unit of the electrical device.

To this effect, the invention relates to a method for operating an electrical device, such as a device for measurement or protection or control of an electrical installation, the electrical device comprising an electronic control unit connected to a communication gateway by a local data exchange link;

- the control unit being able to receive one or more executable software applications, each application being programmed to generate data according to one or more predefined types of data when it is executed by the control unit, the data generated being able to be transmitted to a the communication gateway so as to be made available to a remote terminal,
- the control unit being configured to send, to the communication gateway and by means of the local data exchange link, the data generated by the applications installed in the control unit, only if these data correspond to a type of data to which the communication gateway is subscribed, the subscription status for each type of datum being recorded in the communication gateway;
- this method comprising the auto-configuration of the communication unit, implemented automatically following the installation of a new application in the course of the operation of the electrical device, in which:
  a) the control unit broadcasts, on the local data link, a notification of the installation of a new application;
  b) in response, the communication gateway acquires the list of the types of data to which it is not yet subscribed and then sends to the control unit a request for subscription to these types of data;
  c) the control unit receives the subscription request and, in response, compares the types listed in the subscription request with the types of data generated by the newly installed application, the request for subscription to a type of datum being accepted if data corresponding to this type of data have been generated, the request for subscription to a type of datum being denied in the converse case;
  d) the communication gateway updates, as a function of the response returned by the control unit, the accepted or denied subscription status for each type of datum for which the subscription request has been accepted or denied during step c).

By virtue of the invention, the communication interface is automatically parametrized following the installation of an application, without requiring manual intervention by the user during each installation.

According to advantageous but not compulsory aspects of the invention, such a method can incorporate one or more of the following characteristics, taken in isolation or according to any technically admissible combination:

Steps b) to d) are repeated with a predefined number of iterations, for example lying between two and ten, preferably lies between three and six, preferably still is equal to five.

Each repetition being implemented at the latest after a predefined duration following the end of the preceding repetition of these steps.

The predefined duration is less than or equal to 5 seconds, preferably is less than or equal to 1 second.

Steps b) to d) are repeated after a second predefined duration.

The second duration is greater than the first duration, for example greater than or equal to an hour.

The method comprises steps of automatic unsubscription, in which:
 e) the communication gateway detects that it no longer receives data corresponding to one of the types of data to which it is subscribed;
 f) in response, the communication gateway again sends a request for subscription to the control unit;
 g) The control unit responds with a denial of subscription and the communication gateway updates the status of the corresponding data of the subscription list to an "unsubscribed" status.

The data dispatched by the control unit on the local data exchange link are encapsulated within frames, each frame comprising addressing and synchronization metadata including a value of periodicity of sending of this type of datum, and in which, during step d), the communication gateway considers a datum associated with a type of datum as no longer being received if no datum corresponding to this type of datum has been received after a duration greater than the sending periodicity value contained in the last frame received for this type of datum.

The control unit authorizes the sending, on the internal data exchange link and destined for the communication gateway, of the data generated by the newly installed application corresponding to the types of data for which the communication gateway is subscribed.

According to another aspect, the invention relates to an electrical device, such as a device for measurement or protection or control of an electrical installation, the electrical device comprising an electronic control unit connected to a communication gateway by a local data exchange link;
 the control unit being able to receive one or more executable software applications, each application being programmed to generate data according to one or more predefined types of data when it is executed by the control unit, the data generated being able to be transmitted to a remote terminal by way of the communication gateway;
 the control unit being configured to send, to the communication gateway and by means of the local data exchange link, the data generated by the applications installed in the control unit, only if these data correspond to a type of data to which the communication gateway is subscribed, the subscription status for each type of datum being recorded in the communication gateway;
 the control unit and the communication unit furthermore being programmed to implement automatically, following the installation of a new application in the course of the operation of the electrical device, in which:
  a) the control unit broadcasts, on the local data link, a notification of the installation of a new application;
  b) in response, the communication gateway acquires the list of the types of data to which it is not yet subscribed and then sends to the control unit a request for subscription to these types of data;
  c) the control unit receives the subscription request and, in response, compares the types listed in the subscription request with the types of data generated by the newly installed application, the request for subscription to a type of datum being accepted if data corresponding to this type of data have been generated, the request for subscription to a type of datum being denied in the converse case;
  d) the communication unit updates, as a function of the response returned by the control unit, the subscription status for each type of datum for which the subscription request has been accepted or denied during step c).

The invention will be better understood and other advantages of the latter will become more clearly apparent in the light of the description which follows, of an embodiment of a method for operating an electrical device, which description is given solely by way of example and with reference to the appended drawings in which.

Figure 1:
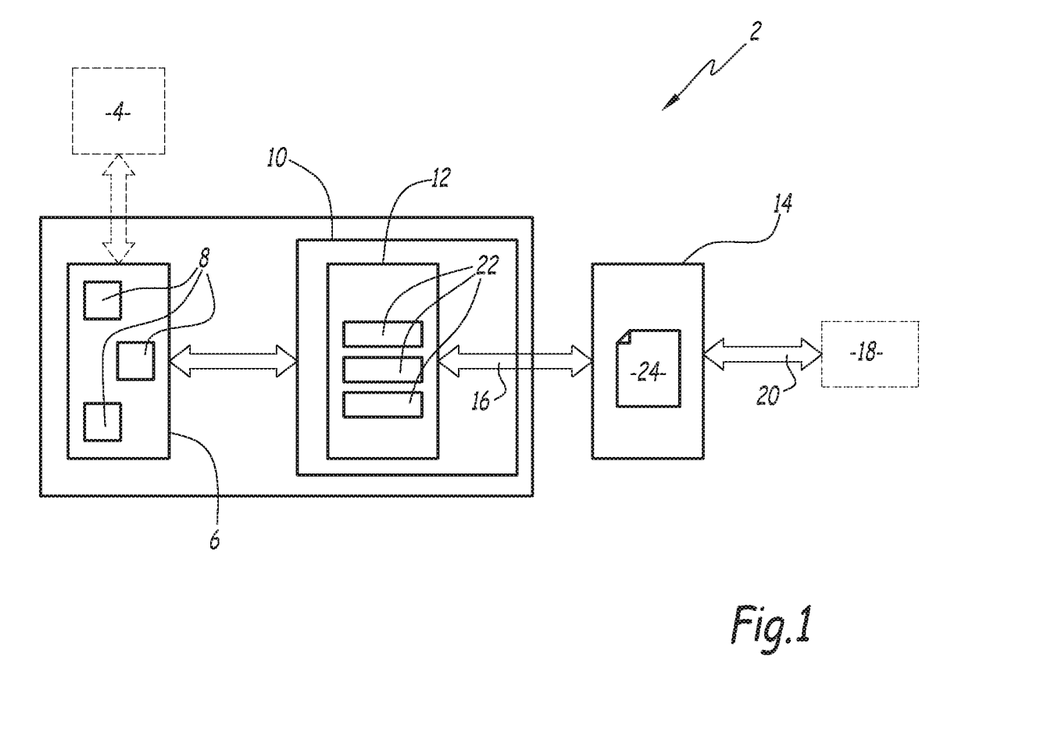
FIG. 1 is a schematic representation of an electrical device according to the invention.

FIG. 1 represents an example of an electrical device 2 associated with an electrical installation 4. For example, the installation 4 is an electricity distribution installation intended to electrically supply one or more power devices, here in an industrial or domestic setting. In this example, the electrical device 2 is hooked up to the installation 4 to drive and/or supervise all or part of the installation 4.

According to various embodiments, the electrical device 2 is an electrical protection device or an electrical measurement device or an electrical switching device, in particular an electrical circuit-breaker device.

In this illustrative example, the device 2 is an isolator or a contactor adapted to interrupt the electrical power supply to the installation 4 in case of detection of an electrical defect or in response to a user command.

The reference 6 designates a main part of the device 2, which part is intended to interact with the installation 4 and which is adapted to implement one or more main functions 8 of the device, such as functions for measurement, and/or protection and/or driving and control of the installation 4. For example, the main part 6 comprises one or more electromechanical, or electrical, or magneto-electrical apparatuses, or any other equivalent apparatus. For example, in the case where the device 2 is an isolator, the main part 6 comprises a member for cutting off the electric current adapted to interrupt the electrical power supply to the installation 4.

The device 2 also comprises an embedded electronic control apparatus 10 which includes an electronic control unit 12. A communication gateway 14 is connected to the device 2 and to the unit 12 by way of a local data exchange link 16.

The control unit 12 is intended to drive or at least to supervise all or part of the functions 8 implemented by the main part 6 of the device 2. Thus, the unit 12 is connected to the main part 6.

The control unit 12 here comprises a calculation logic unit, such as a microprocessor or a microcontroller, a computer memory and a communication interface which is adapted to be hooked up to the link 16. The memory comprises one or more nonvolatile memory modules, for example of Flash or EEPROM technology or any other equivalent data storage technology. The memory comprises, in particular, executable instructions, such as machine code executable by the control unit 12 and/or instructions interpretable by an interpreter implemented by the control unit 12, allowing in particular the implementation of the method of FIG. 3.

The communication gateway 14 is adapted to communicate with a remote terminal 18 situated outside the device 2 by means of a data link 20, such as a network link, for example an Ethernet link. For example, the terminal 18 is a computer client such as an industrial control system of SCADA type.

In this example, the gateway 14 comprises a calculation logic unit of microprocessor or microcontroller type, a computer memory, a communication interface compatible with the link 16, as well as a communication interface with the remote terminal 18. The memory comprises one or more nonvolatile memory modules, for example of Flash or EEPROM technology or any other equivalent data storage technology. The memory comprises, in particular, executable instructions, such as machine code executable by calculation logic of the gateway 14 and/or instructions interpretable by an interpreter implemented by the calculation logic unit of the gateway 14, allowing in particular the implementation the method of FIG. 3.

The link 16 is here a wired data exchange bus, such as a fieldbus, for example of CAN or analogous type. As a variant, a data link using a protocol based on the TCP/IP protocol and comprising analogous application-related layers may also be appropriate.

The control apparatus 10 can also comprise a local control panel, not illustrated, comprising a man-machine control interface that may include an electronic display screen and/or control and data input members such as a keyboard or a touchscreen, as well as a short-range wireless local communication interface and/or a wired communication interface, for example a USB link, and/or a suitable reader adapted to read a removable information recording medium, such as a memory card.

The control unit 12 is programmed to receive executable software modules 22 which are adapted to be installed in the control unit 12 and, once installed, can be executed by the calculation logic unit of the control unit 12. The modules 22 are named "applications" or "application-related modules" in what follows. The applications 22 make it possible to implement advanced functionalities, such as functions for remote control, measurement, processing, supervision and management of the device 2 and/or of the installation 4. In certain cases, the applications 22 are also adapted to control one or more functions 8 of the device 2, as a function of control commands dispatched remotely and received by way of the gateway 14.

Each application 22 comprises instructions executable and/or interpretable by the calculation logic unit of the control unit 12. The applications 22 can be downloaded from a remote computer server or from an on-line service of cloud computing type and/or transferred from a physical medium for recording information by way of the local control panel.

The applications 22 are "pluggable", that is to say that they can be installed and uninstalled "hot" in the control unit 22 while the device 2 is operating, without it being necessary to turn off or to restart the device 2 or the control unit 12 or to interrupt the operation of the device 2, of the main part 6. For example, the installation of an application 22 is carried out by a user. In particular, the link 16 is not interrupted or reinitialized and remains operational.

For example, the control unit 12 comprises an embedded operating system. This operating system is implemented by executing instructions contained in the memory of the control unit 12. The operating system defines a reception area in a work memory of the control unit 12, in which the applications 22 are received once they have been installed. The operating system supervises access by the applications 22 to the hardware resources of the control unit 12 as well as to the main part 6. In this manner, the applications 22 can supervise and/or drive all or part of the functions 8.

Each application 22 generates, during its execution, at least one stream of data able to be transmitted to the gateway 14. The data depend on the nature and role of the corresponding application 22. For example, the data may be representative of an internal state of the device 2, or of the electrical installation 4 with which the device 2 is associated, or of a function 8 of the device 2. For example, these data relate to the presence or absence of electrical power supply, the open/closed state of a circuit-breaker member, or a number of cycles of use of an element, or the indication of a failure or of an anomaly. The data may also be representative of electrical quantities, be they measured or calculated, such as: the electrical power, the electrical voltage, the electric current, or the harmonics of these electrical quantities, but also a phase shift, or a power factor, or an amount of energy. These quantities may be instantaneous or averaged over time over a predefined duration.

The data are for example generated and intended to be sent to the gateway 14. Thus, the device 2 can be controlled and supervised remotely from the terminal 18.

The data generated by the applications 22 may belong to various types of data, or families of data. It is therefore understood that the expression "type of datum" is not limited to a static type of data and that within the meaning of the present description, a "type of datum" can also designate a naming element or an identifier of a family of datum or of a stream of data. The naming elements or the identifiers are for example defined by the manufacturer of the device 2. The type of datum is for example encoded digitally in the form of a variable, such as an alphanumeric character string or a digital index.

For example, in practice, the data are generated by each application 22 continuously or repeated over time. The data are therefore preferentially organized in the form of streams of data. Each stream of data is a series of individual data generated successively over time. The data of one and the same stream are all of one and the same type. Each stream of data is identified in a unique manner by a specific value of type of datum.

Preferably, when a datum is sent by the control unit 12 to the gateway 14 by means of the link 16, this datum is encapsulated within a frame, or message.

Figure 2:
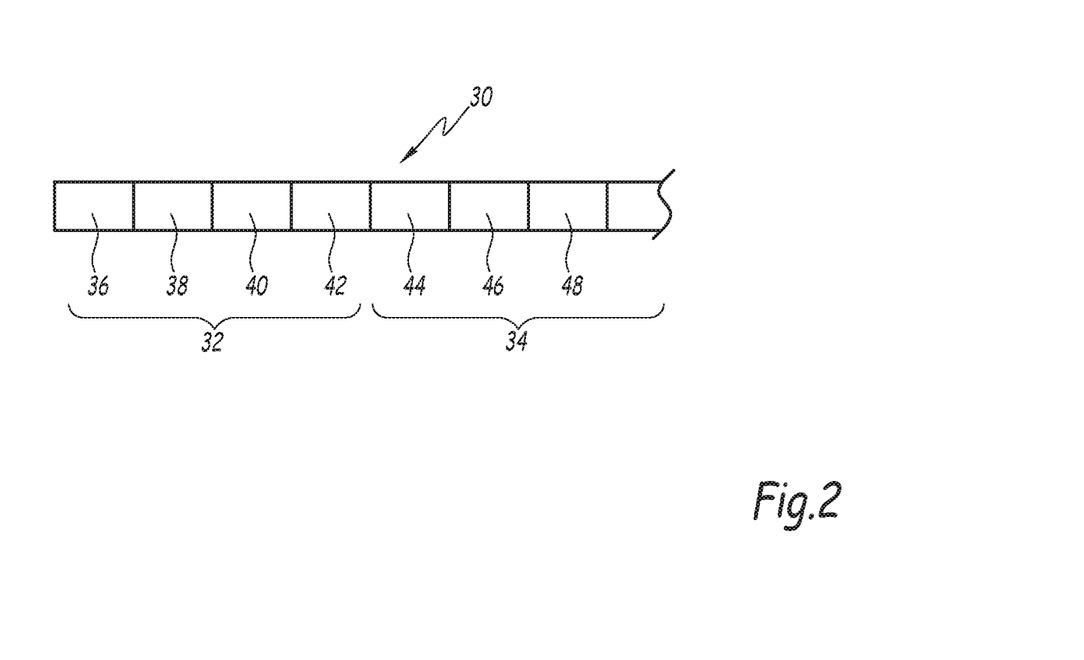
FIG. 2 is a simplified representation of a frame encapsulating a datum sent by an application installed in the electrical device of FIG. 1.

As illustrated in FIG. 2, each frame 30 comprises addressing and synchronization metadata 32 and a body 34 in which the informational content of the frame, in particular the corresponding datum, is stored. In this illustrative and not necessarily limiting example, the metadata 32 comprise:

an identifier 36 of the recipient of the message, an identifier 38 of the sender of the message, an identifier 40 of the nature of the message, in particular to indicate whether the message forms part of a stream in which messages are sent periodically, a value 42 of periodicity of sending of the message associated with this stream of data.

The body 34 comprises at least one datum generated by an application 22. For each datum, the body 34 comprises:

an identifier 44 of the type of datum, an identifier 46 of the physical unit of the datum, for example expressed in the International System, the value 48 of the datum.

The format of the frame 30 may be different. In practice, the format of the frame 30 is adapted as a function of the technology employed to implement the link 16.

For example, each frame 30 is constructed automatically by the control unit 12 on the basis of data generated by an application 22.

According to preferred modes of implementation, the data generated by the applications 22 are not necessarily sent systematically to the gateway 14. Indeed, in certain cases, the end user might not need all the data generated and may choose to receive only certain of the data generated.

Thus, the gateway 14 makes available to the terminal 18 the data that a user has indicated that they wish to receive. The gateway 14 collects from the device 2 only the data defined by the user as having to be made available to the terminal 18.

To this end, the gateway 14 comprises a subscription management system. As illustrated in FIG. 1, the gateway 14 comprises a subscription list 24 in which the type or types of data that the user wishes to receive are defined. The subscription list 24 is for example parametrizable by a user.

The subscription list 24 contains one or more entries each of which associates an identifier of a type of datum with a subscription status. For example, the term "list" designates here in a generic manner a data structure of list, or table, or vector, or database type, or a tree, or any other appropriate data structure.

The subscription status is here a variable which can take one of the following states: subscribed, unsubscribed or discovering. The subscription status can be encoded in digital form, for example as a string of alphanumeric characters or as a digital value.

Within the meaning of the present description, the gateway 14 is said to be subscribed to a stream of data of a given type when this corresponding type of datum is present in the subscription list 24 and the subscription status with which it is associated in this list is equal to "subscribed". The gateway 14 is not subscribed to a stream of data of a given type when this corresponding type of datum is present in the subscription list 24 and the subscription status with which it is associated in this list is equal to "unsubscribed", or else when the corresponding type of datum does not feature in the subscription list 24.

More precisely, in this example, a datum type inscribed in the list 24 but whose subscription status is equal to "unsubscribed" corresponds to a type of datum which is not yet generated by the applications 22 but that the user wishes to receive when this datum becomes available. A type of datum which is not inscribed in the list 24 corresponds to a type of datum that the user does not wish to receive.

The control unit 12 is for its part configured to send, to the gateway 14 and by means of the local link 16, the data generated by the applications 22 installed in the control unit 12 only if these data correspond to a type of data to which the gateway 14 is subscribed.

For example, the control unit 12 sends to the gateway 14 only the data to which the gateway 14 has previously subscribed, that is to say for which it has made a subscription request accepted by the unit 12.

In a particularly advantageous manner, the gateway 14 is programmed to automatically update the subscription status of the data when a new application 22 is installed in the control unit 12. Stated otherwise, the gateway 14 automatically updates the status of a datum present in the list 24 from "unsubscribed" to "subscribed" when this datum becomes available following the installation of a new application 22.

Figure 3:
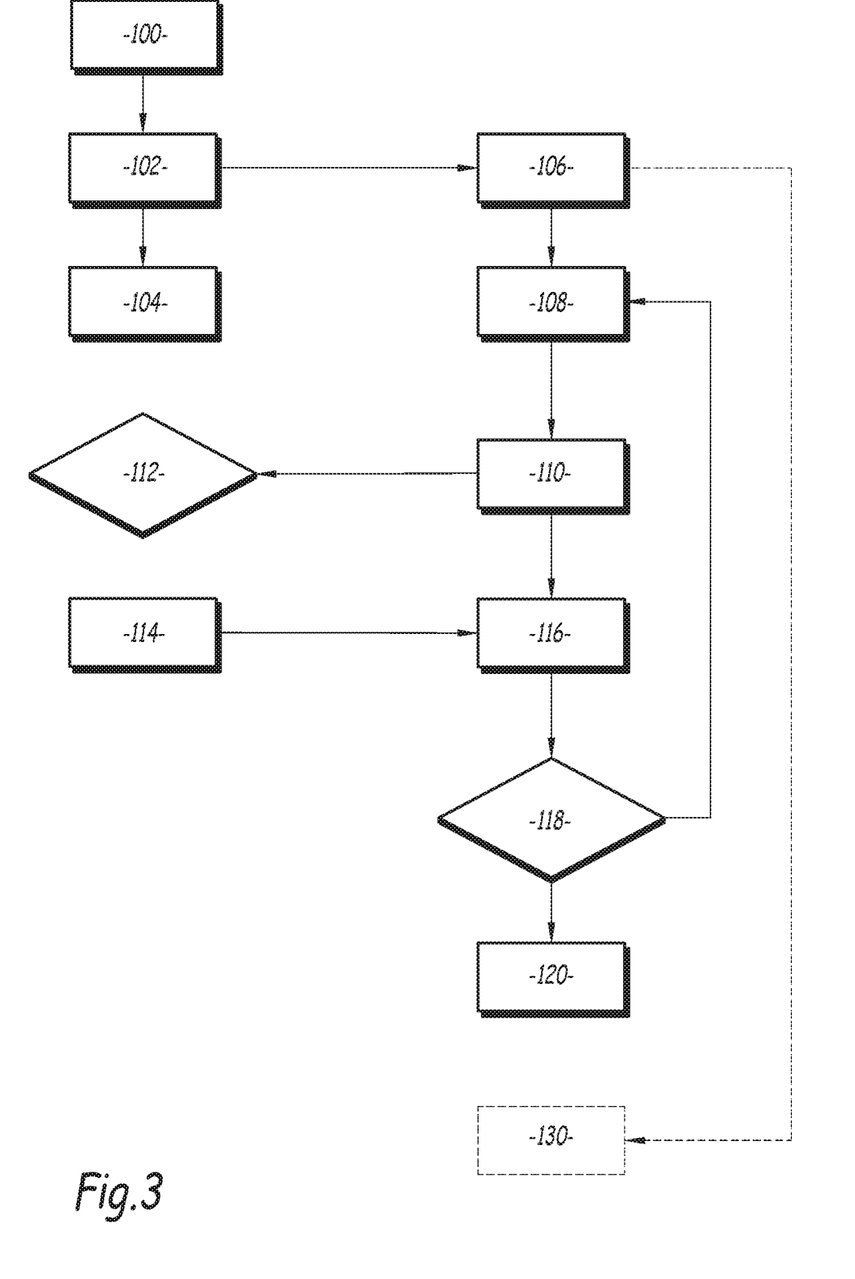
FIG. 3 is a flowchart of a method of operating the device of FIG. 1.

An exemplary implementation of such a method of auto-configuration of the gateway 14 is described with reference to the flowchart of FIG. 3.

To facilitate the understanding of the description which is given of this example, it is considered here, in a purely illustrative and nonlimiting manner, that the list 24 contains data types named D1, D2 and D3 to which it is already subscribed and which are here already generated and sent by one or more applications 22 already installed in the control unit 12. The list 24 also comprises data types named D4, D5, D7 and D10 that the user wishes to receive in future but which are not generated by the already installed applications 22. The gateway 14 is not subscribed to the data D4, D5, D7 and D10 and these therefore possess, in the list 24, a subscription status equal to "non-subscribed".

Firstly, during a step 100, a new application 22 is installed in the control unit 12, for example by a user.

In response, during a step 102, the control unit 12 automatically broadcasts a notification on the local link 16 to notify the installation of the new application 22.

Next, during a step 104, the newly installed application 22 begins to generate data. The nature of the data generated depends on the function programmed into the application 22. At this juncture, the data generated by this application 22 and for which the gateway 14 is not yet subscribed are not sent over the link 16. For example, these data are temporarily stored in a buffer memory inside the control unit 12.

In the illustrative example considered, the newly installed application 22 generates the data D4, D5, D6 and D7 and D10 but these are not sent over the link 16. On the other hand, the data D1, D2 and D3 generated by other, already installed, applications 22 are sent over the link 16 to the gateway 14, since the gateway 14 is subscribed thereto.

In parallel, during a step 106 subsequent to step 102, the gateway 14 receives the notification sent by the control unit 12 over the link 16. In response, the gateway 14 triggers the method of discovery of the data generated by the newly installed application 22.

Thus, during a step 108, the gateway 14 acquires the list of the types of data declared in the subscription list 24 and to which it is not yet subscribed. In the example considered, this entails the data of type D4, D5, D7 and D10.

Thereafter, during a step 110, the gateway 14 sends to the control unit 12 a request for subscription to each of the data types identified during step 108. Stated otherwise, the gateway 14 tries to subscribe to the data generated by the newly installed application 22. This request is for example dispatched in the form of a message or of a prompt by way of the link 16.

During this step 110, the gateway 14 here updates the status of the corresponding data, to indicate that a subscription request is in progress. For example, the subscription state variable is changed to "discovering".

In the example considered, the gateway 14 sends a request for subscription to the data D4, D5, D7 and D10, but not to the datum D6, which does not feature in the list 24.

During a step 112, the control unit 12 receives the subscription request. In response, the control unit 12 automatically compares the data types listed in the subscription requests with the types of data generated by the newly installed application 22. As a variant, this comparison is also performed with the data generated by all the applications 22 installed in the control unit 12. For example, the control unit 12 inspects the data generated by the newly installed application 22 and which are waiting to be sent, for example stored in the buffer memory.

The request for subscription to a type of datum is accepted if data corresponding to this type of data have been generated by the newly installed application 22 or indeed by at least one of the already installed applications 22.

In the converse case, that is to say if no datum corresponding to this type of datum has been generated or found among the data generated by the newly installed application 22, then the request for subscription to a type of datum is denied.

Thereafter, during a step 114, the control unit 12 sends to the gateway 14 a response for each subscription request previously received, for example a subscription acceptance or denial response.

For example, in practice, a latency time may exist before the newly installed application 22 begins to generate data. In the cases where the application 22 is capable of generating various types of data, it is possible that these data do not all begin to be generated at the same time during step 104. Certain types of data may begin to be generated only after a longer latency time than certain other types of data.

In the example considered, at the moment at which step 112 is implemented, the newly installed application 22 has begun to generate the data D4, D5 and D6, but not the data D7 and D10. The control unit 12 accepts the subscription request for the data D4 and D5 but not for the data D7 and D10.

Finally, during a step 116, the gateway 14 updates the subscription list 24 as a function of the response returned by the control unit 12, for example by changing the subscription status to the value "subscribed" or "unsubscribed" for each type of datum for which the subscription request has been accepted or denied during step 112. In the illustrative example, this relates here to the data D4 and D5 (subscribed) and D7 and D10 (unsubscribed).

Advantageously, steps 108 to 116 of the method are repeated one or more times on completion of step 116. Indeed, in practice, it is possible that certain data have not begun to be generated by the application 22 on account of a higher latency time than the duration of implementation of step 112, or because of a temporary disturbance affecting the control unit 12. Preferably, during step 112, the time taken to perform the comparison remains less than a predefined maximum duration, so as not to block the execution of the method. As a variant, the gateway 14 may be programmed so as, during step 116, to consider by default that a request for subscription to a type of datum is denied if no positive response has been received before the expiry of an allowed time span. In this case, during step 114, the control unit 12 does not necessarily send a denial of subscription and only the responses accepting a subscription request are sent to the gateway 14.

Thus, during a step 118, the gateway 14 determines whether a repetition of the method, or reiteration, must be implemented. For example, the number of iterations is predefined. For example, the predefined number of iterations lies between two and ten, preferably lies between three and six, preferably still is equal to five.

If no repetition is determined as being necessary, then the method terminates during a step 120. Conversely, if a repetition is implemented, then step 108 is implemented in the same manner as described hereinabove.

According to modes of implementation, the number of iteration is stored in a counter which is decremented during step 118 each time a repetition of the method is implemented. The number of iteration is here a non-zero integer. The counter is reinitialized to the predefined value when subsequent to the installation of another new application 22, for example during step 106.

Thus, during each step 118, the gateway 14 verifies whether a repetition should be implemented, by consulting the value of the counter. If the value of the counter is equal to zero, no repetition is necessary and step 120 is implemented. Conversely, if the value of the counter is greater than or equal to one, then step 108 is implemented again.

Preferably, each repetition being implemented at the latest after a first predefined duration following the end of the preceding repetition of these steps. For example, the first predefined duration is less than or equal to 5 seconds, preferably is less than or equal to 1 second. Thus, preferably, all the repetitions together remain less than a minute, and preferably less than 30 seconds.

These repetitions therefore make it possible to take into account data generated by the application 22 newly installed, which were not able to be taken into account during the first execution of step 112.

In the example considered, the data D7 and D10 begin to be generated only after the first execution of steps 108 to 116. The succeeding repetitions allow the gateway 14 to subscribe to the data D7 and D10, in so far as the latter are then available during at least one of the subsequent executions of step 112.

As a variant, no extra repetition 130 is implemented and the method passes directly to step 120 following step 116.

In an advantageous manner, the method also comprises an extra repetition 130 in the course of which steps 108 to 116 are implemented again. This repetition 130 is implemented independently of the optional repetitions put in place after step 118.

For example, the repetition 130 is triggered automatically on expiry of a second predefined duration following the starting of the method during step 106. As a variant, this duration can be counted down from step 120 at the end of the last of the preceding repetitions. By way of example, the second duration is greater than or equal to an hour. For example, the second duration is greater than the first duration. Stated otherwise, the extra repetition 130 is implemented with a longer cycle than the other repetitions of the method.

The extra repetition 130 makes it possible to take into account data generated by the newly installed application 22, which were not able to be taken into account during the first execution of step 112 because of a blip-like disturbance which might have been able to last long enough to also affect the repetitions triggered after step 118. As the repetition 130 is put in place long after the repetitions triggered after step 118, the risk of being affected by this blip-like disturbance is lower, since there is more chance of this blip-like disturbance having disappeared in the meantime.

As a variant, no extra repetition 130 is implemented.

In parallel with these steps, once a subscription request for a type of data is accepted on completion of step 112, the control unit 12 authorizes the sending to the gateway 14 of the data generated by the newly installed application 22 and corresponding to this type of data.

By virtue of the invention, the communication interface is automatically parametrized following the installation of an application, without requiring manual intervention by the user during each installation, since this would considerably complicate the use of the device. One also avoids unnecessarily saturating the data exchange links by sending data which the user does not need. Thus, the upgradable and modular behaviour of the device 2 is safeguarded without interrupting operation or restarting the devices 2 and 14 or reinitializing the communications while ensuring satisfactory simplicity of use.

Figure 4:
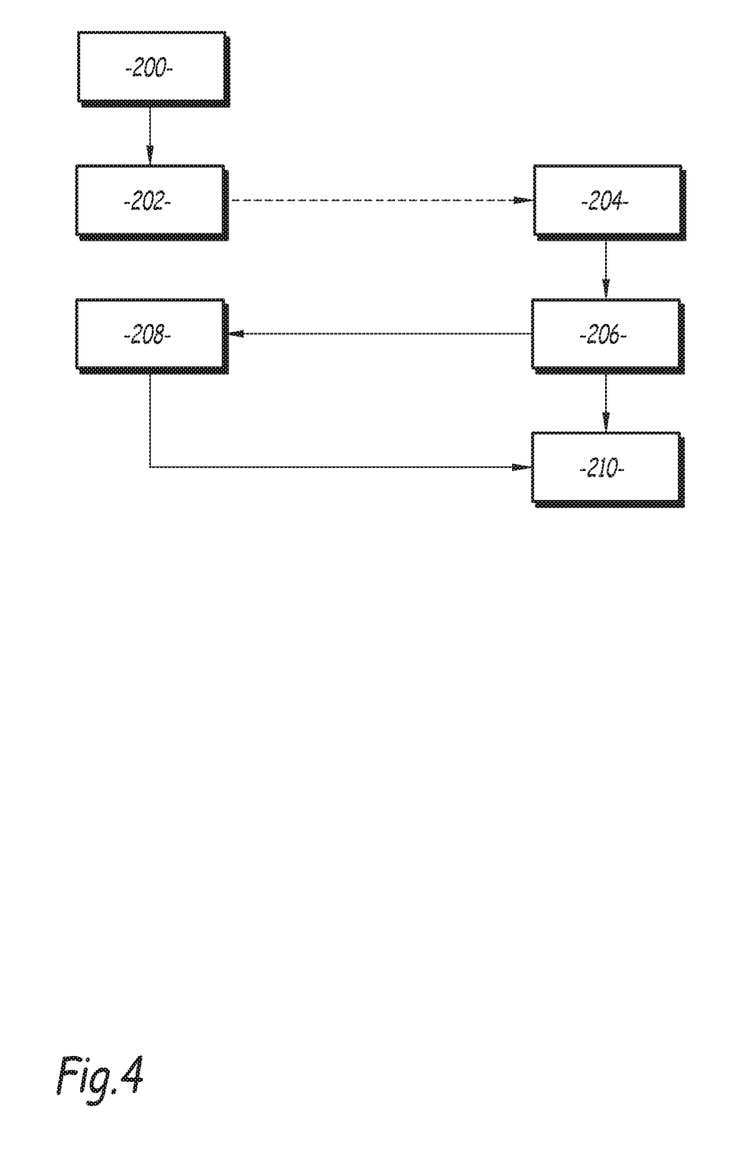
FIG. 4 is a flowchart of a particular embodiment of the operating method of FIG. 3.

FIG. 4 represents an example of a method of automatic unsubscription optionally implemented by the gateway 14 following the uninstalling of an application 22.

For example, during a step 200, a previously installed application 22 is uninstalled from the control unit 12. The data previously generated by this application 22 and to which the gateway 14 was subscribed therefore cease to be generated during a step 202.

In response, during a step 204, the gateway 14 detects that it no longer receives over the link 16 the data corresponding to at least one of the types of data to which it is subscribed.

According to preferential embodiments, this detection is based on the periodicity value 42 contained in the last frame received for this datum. For example, this periodicity value 42 announces the maximum time span after which the next frame 30 is presumed to be received for this datum. Thus, the gateway 14 considers a datum associated with a type of datum as no longer being received if no datum corresponding to this type of datum has been received after a duration greater than the periodicity value 42 contained in the last frame received for this type of datum. As a variant, the detection can be carried out differently.

During a step 206, the gateway 14 again sends a request for subscription to the control unit 12 over the link 16. In the course of a step 208, the control unit 12 processes the request and (on account of the absence of the module 22) sends a denial of subscription through the link 16 to the gateway 14 as a consequence the status of the data of the subscription list 24 passes to the "unsubscribed" state.

Finally, during a step 210, the gateway 14 updates the subscription status of the corresponding type or types of data, for example by modifying the list 24 so as to change the subscription status of the corresponding data to the value "unsubscribed".

The embodiments and the variants envisaged hereinabove may be combined together to generate new embodiments.

The invention claimed is:

1. A method for operating an electrical device, which is an electrical circuit-breaker device for an electrical installation, the electrical device comprising an embedded electronic control unit connected to a communication gateway by a local data exchange link;

the electronic control unit being able to receive one or more executable software applications which are pluggable such that they are configured to be installed or uninstalled while the electrical circuit-breaker device is operating without requiring turning off, restarting, or interrupting the electrical circuit-breaker device, each application being programmed to generate data according to one or more predefined types of data when it is executed by the electronic control unit, the data generated being able to be transmitted to a the communication gateway so as to be made available to a remote terminal, the electronic control unit being configured to send, to the communication gateway and with the local data exchange link, the data generated by the applications installed in the electronic control unit, only if the data correspond to a type of data to which the communication gateway is subscribed, a subscription status for each type of datum being recorded in the communication gateway;

the method comprising auto-configuration of a communication link, implemented automatically subsequent to the installation of a new application in a course of the operation of the electrical device, wherein:

a) the electronic control unit broadcasts, on the local data link, a notification of the installation of the new application;

b) in response, the communication gateway acquires a list of the types of data to which it is not yet subscribed and then sends to the electronic control unit a request for subscription to the types of data;

c) the electronic control unit receives the subscription request and, performs a comparison of the types listed in the subscription request with the types of data generated by the newly installed application, the request for subscription to a type of datum being accepted if data corresponding to the type of data have been generated, the request for subscription to a type of datum being denied in a converse case;

d) the communication gateway updates, as a function of the comparison performed by the electronic control unit, the accepted or denied subscription status for each type of the datum for which the subscription request has been accepted or denied during step c).

2. The method according to claim 1, wherein steps b) to d) are repeated with a predefined number of iterations, the predefined number lying between two and ten.

3. The method according to claim 2, wherein steps b) to d) are repeated within a predefined duration following an end of a preceding iteration of the steps.

4. The method according to claim 3, wherein the predefined duration is less than or equal to 5 seconds.

5. The method according to claim 4, wherein the predefined duration is a first predefined duration and steps b) to d) are repeated again after a second predefined duration following the notification of the installation of a new application.

6. The method according to claim 5, wherein the second predefined duration is greater than the first predefined duration.

7. The method according to claim 1, comprising steps of automatic unsubscription, wherein:

the communication gateway detects that it no longer receives data corresponding to one of the types of data to which it is subscribed;

in response, the communication gateway again sends a request for subscription to the electronic control unit;

the electronic control unit responds with a denial of subscription and the communication gateway updates a status of the corresponding data of the subscription list to a "unsubscribed" status.

8. The method according to claim 7, wherein the data dispatched by the electronic control unit on the local data exchange link are encapsulated within frames, each frame comprising addressing and synchronization metadata including a value of periodicity of sending of the type of datum as no longer being received if no datum corresponding to the type of datum has been received after a duration greater than the sending periodicity value contained in the last frame received for the type of datum.

9. The method according to claim 1, wherein subsequent to step d), the electronic control unit authorizes the sending, on the local data exchange link and destined for the communication gateway, of the data generated by the newly installed application corresponding to the types of data for which the communication gateway is subscribed.

10. An electrical device which is an electrical circuit-breaker device for an electrical installation, the electrical device comprising an embedded electronic control unit connected to a communication gateway by a local data exchange link;

the electronic control unit being able to receive one or more executable software applications which are pluggable such that they are configured to be installed or uninstalled while the electrical circuit-breaker device is operating without requiring turning off, restarting, or interrupting the electrical circuit-breaker device, each application being programmed to generate data according to one or more predefined types of data when it is executed by the electronic control unit, the data generated being able to be transmitted to a remote terminal by way of the communication gateway;

the electronic control unit being configured to send, to the communication gateway and with the local data exchange link, the data generated by the applications installed in the electronic control unit, only if the data correspond to a type of data to which the communication gateway is subscribed, a subscription status for each type of datum being recorded in the communication gateway;

the electronic control unit and a communication link furthermore being programmed to implement automatically, subsequent to the installation of a new application in a case of the operation of the electrical device, wherein:

a) the electronic control unit broadcasts, on the local data link, a notification of the installation of the new application;

b) in response, the communication gateway acquires a list of the types of data to which it is not yet subscribed and then sends to the electronic control unit a request for subscription to the types of data;

c) the electronic control unit receives the subscription request and, performs a comparison of the types listed in the subscription request with the types of data generated by the newly installed application, the request for subscription to a type of datum being accepted if data corresponding to the type of data have been generated, the request for subscription to a type of datum being denied in a converse case;

d) the communication gateway updates, as a function of the comparison performed by the electronic control unit, the accepted or denied subscription status for each type of the datum for which the subscription request has been accepted or denied during step c).

\* \* \* \* \*